United States Patent [19]

Mizuhara

[11] Patent Number: 4,938,922

[45] Date of Patent: Jul. 3, 1990

[54] GOLD-NICKEL-TITANIUM BRAZING ALLOY

[75] Inventor: Howard Mizuhara, Hillsborough, Calif.

[73] Assignee: GTE Products Corporation, Stamford, Conn.

[21] Appl. No.: 370,490

[22] Filed: Jun. 23, 1989

[51] Int. Cl.$^5$ ............................................. C22C 5/02
[52] U.S. Cl. .............................. 420/508; 228/263.18; 420/512; 428/606
[58] Field of Search ................ 420/508, 512; 428/606; 228/263.18

[56] References Cited

U.S. PATENT DOCUMENTS 4,486,386  12/1984  Mizuhara ..................... 428/606
4,678,636   7/1987  Mizuhara ..................... 420/512

FOREIGN PATENT DOCUMENTS 5833  1/1982  Japan ............................. 420/512

Primary Examiner—Robert McDowell
Attorney, Agent, or Firm—James Theodosopoulos

[57] ABSTRACT

A brazing alloy in accordance with this invention has the following composition, by weight: 91 to 99% gold, 0.5 to 7% nickel; 0.10 to 2% titanium. Alternatively, with palladium present, the composition is as follows, by weight: 83 to 96% gold; 3 to 10% palladium; 0.5 to 5% nickel; 0.10 to 2% titanium.

10 Claims, No Drawings

GOLD-NICKEL-TITANIUM BRAZING ALLOY

The Government of the United States of America has rights in this invention pursuant to Subcontract No. 86X-SB047C awarded by or for the U.S. Department of Energy.

This invention concerns a brazing alloy containing gold, nickel, titanium and, optionally, palladium. The alloy is particularly suitable for brazing silicon nitride ceramic to Incolloy 909 alloy for automotive use, say, in internal combustion engines. The dissimilarity in thermal expansion coefficients ($3 \times 10^{-6}/°C$ for silicon nitride, $8 \times 10^{-6}/°C$ for Incolloy 909) requires that the brazing alloy be ductile and plastically flow during controlled post-braze cooling. If, in some cases, the room temperature residual stress is still too high, a lower thermal expansion metal such as molybdenum ($6 \times 10^{-6}/°C$) can be used between the Incolloy 909 and the silicon nitride. An additional problem that can occur when joining dissimilar materials is that the brazing filler alloy composition can change during brazing, thereby increasing the hardness, which limits plastic flow, and can result in a high stress joint on cooling to room temperature.

The alloy is also required to resist oxidation at temperatures up to 650° C. to resist chemical corrosion at that temperature to the chemicals found in typical fuels used in internal combustion engines.

Brazing alloys containing gold, nickel, titanium are shown in U.S. Pat. Nos. 4,606,978, 4,604,328, 4,678,636 and 4,690,876. In '978, '328 and '876, the amount of copper present, 5% or more, reduces the melting point too much, as does the presence of 15-70% copper or nickel in '636, and also reduces resistance to oxidation and chemical corrosion. U.S. Pat. No. 4,606,981 discloses 0.1 to 4% titanium, balance gold, and U.S. Pat. No. 4,486,386 discloses up to 4% titanium, balance gold and palladium. However, in the instant invention, a small controlled amount of nickel is required to improve wetting of ceramic. U.S. Pat. No. 4,591,535 discloses 1 to 3% titanium, 16 to 20% nickel, balance gold. The nickel content is too high; it reduces melting point and increases alloy hardness.

A brazing alloy in accordance with this invention has the following composition, by weight: 91 to 99% gold, 0.5 to 7% nickel; 0.10 to 2% titanium. Alternatively, with palladium present, the composition is as follows, by weight: 83 to 96% gold; 3 to 10% palladium; 0.5 to 5% nickel; 0.10 to 2% titanium.

An alloy as per this invention has high ductility. In some embodiments, it can be reduced in thickness more than 99% without an intermediate anneal. The alloy is soft with Knoop hardness from 90-200. It shows excellent oxidation resistance at 650° C. and has no visible reaction to acid and alkali treatment. It wets alumina, silicon nitride, zirconia, graphite.

EXAMPLE 1: (in weight percent)

An alloy consisting of 96% gold, 3% nickel and 1% titanium was prepared by melting a 20 gram button on a water cooled copper hearth using tungsten electrode, and argon gas atmosphere. The alloy was found to have a liquidus of 1030° C. and solidus of 995° C. The hardness of this alloy was found to be 168 Knoop hardness using 100 gram load.

A 2 mil foil of this alloy was placed between a 0.75" diameter by 1" long right cylinder made from SNW-2000 silicon nitride, and ductile cast iron 1"×1"×0.1", and brazed at 1040° C. by 5 minutes under $10^{-5}$ torr vacuum and slowly cooled. The silicon nitride showed a crack nearly parallel to the cast iron substrate.

A repeat test was made using a molybdenum interlayer 1"×1"×0.60" thick between silicon nitride cylinder and ductile cast iron. As above, the parts were brazed using 1"×1"×0.002" thick brazing filler metal between silicon nitride and molybdenum, and between molybdenum and ductile iron. This assembly brazed intact with fillet between molybdenum and silicon nitride ceramic.

EXAMPLE 2:

An alloy of 99% gold, 1% titanium was prepared and a ¼" diameter by ½" long 410 stainless steel right cylinder was placed on SNW-2000 substrate with ½"×½"×2 mil alloy foil therebetween.

This alloy with liquidus of 1080° C. and solidus of 1050° C. was brazed at 1100° C. under $10^{-5}$ torr vacuum showed no fillet. Similar test was made with Example 1 alloy at 1040° C., showed full fillet between the stainless steel right cylinder and silicon nitride substrate.

EXAMPLE 3:

As in Example 1, an alloy of 91.5 gold, 5% palladium. 2% nickel and 1.50% titanium was prepared and rolled into 2 mil foil.

An assembly of 0.75" diameter×1" long SNW-2000 silicon nitride right cylinder, was placed over 0.060"×1"×1" molybdenum substrate, over 0.060"×1"×1" ductile iron, with 4 mil foil (two layers of 2 mil foil) of brazing alloy between silicon nitride and molybdenum, and between molybdenum and ductile iron.

The assembly was brazed at 1150+ C. by 10 minutes under $10^{-5}$ torr vacuum. An excellent intact braze with full fillet formed between silicon nitride and molybdenum substrate.

Table 1 shows alloy compositions within this invention. The compositions are in weight percent.

TABLE 1

| Alloy # | Gold | Palladium | Nickel | Titanium | Liquidus °C. | Solidus °C. | KHN |
|---|---|---|---|---|---|---|---|
| 1 | 96.4 |  | 3.0 | 0.6 | 1024 | 1007 | 140 |
| 2 | 97.5 |  | 2.0 | 0.5 | 1031 | 1018 | 91 |
| 3 | 96.0 |  | 3.0 | 1.0 | 1030 | 995 | 168 |
| 4 | 94.0 |  | 5 | 1.0 | 1006 | 987 | 199 |
| 5 | 91.5 | 5.0 | 2.0 | 1.5 | 1133 | 1077 | 170 |
| 6 | 92.5 | 5.0 | 2.0 | 0.5 | 1128 | 1084 | 117 |
| 7 | 92.0 | 5.0 | 2.0 | 1.0 | 1114 | 1084 | 163 |
| 8 | 91.5 | 5.0 | 3.0 | 0.5 | 1113 | 1058 | 111 |

All the alloys in Table 1 maintained brightness after an oxidation test of 48 hours at 650° C. in stagnant air. There was no visible reaction when the alloys were immersed in the following concentrated acids at their boiling point at atmospheric pressure: sulfuric, phosphoric, nitric, hydrochloric.

I claim:

1. A brazing alloy for brazing ceramics having the following composition, in weight percent: 91 to 99% gold; 0.5 to 7% nickel; 0.10 to 2% titanium.

2. The brazing alloy of claim 1 having the following composition: 96% gold; 3% nickel; 1% titanium.

3. The brazing alloy of claim 1 having the following composition: 96.4% gold; 3.0% nickel; 0.6% titanium.

4. The brazing alloy of claim 1 having the following composition: 97.5 gold; 2.0% nickel; 0.5% titanium.

5. The brazing alloy of claim 1 having the following composition: 94.0% gold; 5.0% nickel; 1.0% titanium.

6. A brazing alloy for brazing ceramics having the following composition, in weight percent: 83 to 96% gold; 3 to 10% palladium; 0.5 to 5% nickel; 0.10 to 2% titanium.

7. The brazing alloy of claim 6 having the following composition: 91.5% gold; 5.0% palladium; 2% nickel; 1.5% titanium.

8. The brazing alloy of claim 6 having the following composition: 92.5% gold; 5.0% palladium; 2% nickel; 0.5% titanium.

9. The brazing alloy of claim 6 having the following composition: 92.0% gold; 5.0% palladium; 2% nickel; 1.0% titanium.

10. The brazing alloy of claim 6 having the following composition: 91.5% gold; 5.0% palladium; 3% nickel; 0.5% titanium.

* * * * *